United States Patent Office 3,496,244
Patented Feb. 17, 1970

3,496,244
PRODUCTION OF DICHLOROETHANE
Sidney Berkowitz, Highland Park, and Albert R. Morgan, Jr., Princeton, N.J., assignors to FMC Corporation, New York, N.Y., a corporation of Delaware
No Drawing. Filed Sept. 14, 1965, Ser. No. 487,316
Int. Cl. C07c 17/02
U.S. Cl. 260—662                            7 Claims

ABSTRACT OF THE DISCLOSURE

A method for the production of dichloroethane essentially pure and in high yields and in a short reaction time which comprises reacting vapors of chlorine and ethylene in a specified molar ratio and in the presence of a catalytic and reaction-controlling amount of oxygen, at an elevated temperature for at least 0.1 second in the presence of a catalyst-diluent comprised of particulate sodium chloride, potassium chloride or mixtures thereof.

---

This invention relates to the production of dichloroethane, and particularly to an efficient and short-time vapor-phase process for producing this material from ethylene and chlorine.

Dichloroethane is difficult and expensive to produce in high yields by methods known heretofore. Prior methods have often involved liquid phase reactions, which provide mixtures of dichloroethane and other materials which must be distilled or otherwise treated for isolation of the desired dichloroethane product.

In our co-pending U.S. patent application Ser. No. 487,299, filed Sept. 14, 1965, we teach and claim a method for the production of mixtures of dichloroethane and trichloroethane by vapor phase contact of chlorine and ethylene in a molar ratio of 1.1 to 2:1 of chlorine to ethylene for at least 0.1 second, in the presence of a catalyst and diluent bed of particles of sodium chloride, potassium chloride or mixtures of these two chlorides, having a particle size of about 2 to 100 mesh. The reaction is carried out at about 80° to 350° C., and utilizes essentially all of the chlorine and ethylene fed, yielding mixtures of dichloroethane and trichloroethane.

The method of our aforesaid co-pending application is an excellent means of producing these mixtures. However, it remains necessary to isolate the dichloroethane product if it is desired to provide it pure, and it has continued to be desired to provide a process which is fast and efficient for producing dichloroethane.

It therefore is a feature of our invention to provide a short time and highly efficient reaction for the production of dichloroethane from ethylene and chlorine.

We have now found that we can produce essentially pure dichloroethane in high yields by a simple modification of the process of our above mentioned co-pending U.S. patent application. In our herein new and improved process we contact chlorine and ethylene in amounts to provide at least 1 mole of chlorine per mole of ethylene in vapor phase for at least 0.1 second and at 80° to 350° C., and preferably 200° to 220° C., with a catalyst and diluent bed of 2 to 100 U.S. standard mesh, and preferably 4 to 16 mesh, particles of sodium chloride, potassium chloride or mixtures of sodium chloride and potassium chloride. Our improvement, which makes it possible to provide essentially pure dichloroethane, involves employing in the vapor phase reaction mixture a catalytic and reaction-controlling amount of oxygen; preferably in the form of air; this catalytic amount is 0.01 to 2.0% of the total amount of chlorine, ethylene and oxygen. When the preferred oxygen carrier additive air is employed as the oxygen source, the calculation for the amount of air employed can be made simply by multiplying the amount calculated for oxygen by five, since air is composed essentialy of 20% of oxygen. Obviously other mixtures of oxygen with gases inert to the herein reaction may be employed, and the amounts of such mixtures are calculated on the basis of their oxygen contents as in the case of air.

Quite surprisingly, carrying out our reaction in the presence of oxygen, and preferably of air, controls the reaction of chlorine and ethylene to yield essentially pure dichloroethane, whether or not the ethylene and chlorine are fed in stoichiometric amounts to provide the dichloroethane. This is contrasted to the behavior of such a reaction in the absence of our catalytic and reaction-controlling amount of oxygen; reactions carried out without oxygen provide mixtures of dichloroethane and trichloroethane, even where stoichiometric amounts of chlorine and ethylene required to yield dichloroethane are employed. In the case of our controlled reaction, employing oxygen in the reaction feed, excess chlorine if it is present in the reaction mixture simply passes through the reactor and is recovered as such.

The oxygen added to the reaction may be introduced as such, or as mixtures of oxygen with other gases or vapors inert to our reaction. Preferably it is added in the form of air. In any event, the amount of oxygen present is 0.01 to 2% of the total of oxygen, chlorine and ethylene fed, and as indicated above, calculation of the amount of air to employ is made simply by multiplying the calculated amount of oxygen by five.

The catalyst bed, which also serves as a solid reaction diluent, is a bed of sodium chloride, potassium chloride or a mixture of sodium chloride and potassium chloride particles having a particle size on the order of 2 to 100 U.S. standard mesh, and preferably 4 to 16 U.S. standard mesh. Particles smaller than 100 mesh tend to blow out of the reactor and are wasted, whereas larger particles are difficult to obtain and in any event have a low surface area available for contact with the reaction gases, relative to the particles employed by us.

One particularly useful material for the catalyst bed is rock salt, one form of which may be obtained as halite, produced by International Salt Co. and having a particle size of 4 to 16 U.S. standard mesh. Another useful material is Sylvinite which is a naturally occurring mineral composed of roughly 50 parts of sodium chloride to 50 parts of potassium chloride on a molar basis. This proportion of sodium chloride and potassium chloride in Sylvinite is variable, and depends on the source of the material; it may range as far as 60% or more of either. Small amounts, up to 20%, of the total bed weight, of solids inert or catalytic to the reaction may be provided in the bed, provided they do not either speed the reaction too much (if catalytic) or make necessary an uneconomically large bed (if they are inert). However, we prefer to employ beds composed essentially entirely of the herein chlorides.

The bed is provided in a depth which allows for the required residence time of at least 0.1 second, and preferably not more than about 10 seconds. The upper limit on the contact time is set only for economic reasons, it being possible to permit the gaseous reactants and reaction products to remain in contact with the bed for longer times. It is necessary only that the contact be for a sufficient time to permit complete reaction to occur. Preferably the bed is 5 to 50 inches in depth.

The bed preferably is a fixed bed of catalyst and diluent particles, although it is possible to fluidize the catalyst and diluent if it has a proper fluidizable size, namely 30 to 100 mesh.

Any suitable apparatus can be used for the catalyst and diluent bed, it only being necessary to provide for feed of the chlorine and ethylene reactants and of the oxygen catalyst and reaction controller, and any gaseous or vapor diluent which may be used. Product gases are recovered and either used as such or distilled to separate them if desired.

The flow rate of reactants through the bed is not critical so long as it is sufficient, coupled with the depth of the catalyst and diluent bed and the particle size of the catalyst-diluent, to provide the desired residence time of at least 0.1 second. Deeper beds permit faster flow, and vice-versa. Generally the flow rate should be about 5 to 500 cc./sec. cm.$^2$.

The reaction of chlorine and ethylene can be carried out suitably at about 80° to 350° C., although we prefer to operate at about 200° to 220° C. Operation substantially below 80° C. results in a slow, incomplete reaction whereas it is difficult to control reactions carried out much above 350° C.

The reactants in our process are chlorine and ethylene, and they are used in a molar ratio of at least 1 mole of chlorine per mole of ethylene. Only 1 mole of chlorine reacts with the ethylene, so that use of more than 1 mole of chlorine requires either wasting the excess which comes through the reactor unreacted, or recovery of it, and therefore use of an excess of chlorine is not economically desirable. However, the process is effective even though excess chlorine, for example on the order of up to 2 moles of chlorine per mole of ethylene, is employed.

A diluent gas may be used together with the chlorine, ethylene and oxygen. The diluent may be used in amounts from zero up to about 50% of the weight of the total gases or vapor fed. The use of a diluent is desirable for reaction control purposes, particularly where temperatures at the upper end of the herein temperature range are employed. Any gas or vapor which is inert to the reaction is used as a diluent. Suitable diluents include hydrogen chloride, nitrogen, perchloroethylene and carbon tetrachloride.

The product of the reaction contains 1,2-dichloroethane, and any excess chlorine which may have been fed above the stoichiometric amount required for production of 1,2-dichloroethane from the ethylene. Any excess chlorine is simply recovered by known techniques.

The following examples are presented by way of illustration of this invention only and are not to be considered as limiting the scope thereof in any way.

EXAMPLE 1

A 25 mm. I.D. glass tube having a 10 mm. thermowell was packed with rock salt (halite sodium chloride having a particle size of 4–8 mesh) for a depth of 22 inches. The tube was heated in an electrical furnace to 200° C., and a gas stream containing 21.25 mmoles per minute of ethylene, 30 mmoles per minute of chlorine (this represents a molar excess of chlorine), 16 mmoles per minute of nitrogen, and 2 mmoles per minute of air was fed into the reactor. The exit gas stream passed through a series of traps cooled to −78° C. The contact time of the bed was about 7 seconds. After 30 minutes of running, product was collected and analyzed with the following results:

Product: Mmoles per minute
1,2-dichloroethane _____ 21.25

The excess chlorine was recovered, and the chlorine and carbon balances were about 100%, indicating an essentially 100% conversion of ethylene to dichloroethane.

EXAMPLE 2

The same reactor and reaction conditions as employed in Example 1 were employed in this example, with the exception that the halite was replaced with Morton's Southern Star Rocksalt assaying 99.6% sodium chloride and having a particle size of 4–8 mesh. The product stream was collected and analyzed with the following results:

Product: Mmoles per minute
1,2-dichloroethane _____ 21.25

The excess chlorine was recovered, and the chlorine and carbon balances determined to be essentially 100%. This indicated essentially 100% conversion of ethylene to dichloroethane.

EXAMPLE 3

The same reactor and reaction condition as employed in Example 2 were used, except that the incoming feed was 21.25 mmoles per minute of ethylene, 21.25 mmoles per minute of chlorine (equal molar amounts of ethylene and chlorine), 60 mmoles per minute of nitrogen and 2 mmoles per minute of air. The following results were obtained when a sample of the product stream was collected and analyzed:

Product: Mmoles per minute
1,2-dichloroethane _____ 21.25

The yield was 100%.

EXAMPLE 4

The same reactor and feed stream as in Example 1 were employed in this example, except the temperature was changed to 270° to 280° C. Results of analysis of the product stream were as follows:

Product: Mmoles per minute
1,2-dichloroethane _____ 21.25

The excess chlorine was recovered, and chlorine and carbon balances determined to be essentially 100%. This indicated an essentially 100% conversion of ethylene to dichloroethane.

COMPARATIVE EXAMPLE A

The same reactor and reaction conditions were employed in this example as were employed in Examples 1 and 2 except that the incoming feed was 21.25 mmoles per minute of ethylene, 30 mmoles per minute of chlorine (excess chlorine), 16 mmoles per minute of nitrogen and *no* air. The product stream was collected and assayed as follows:

Product: Mmoles per minute
1,2-dichloroethane _____ 10.75
1,1,2-trichloroethane _____ 8.8
1,1,2,2-tetrachloroethane _____ 0.72
1,1,1,2-tetrachloroethane _____ 0.62

The conversion of ethylene to chlorinated products was less than 100%. It will be seen that in the absence of air, substitution reactions took place, producing a mixture of chlorinated ethanes.

EXAMPLE 5

A 25 mm. I.D. glass tube having a 10 mm. thermowell was packed with Sylvinitet (50% sodium chloride), 50% potassium chloride) having a mesh size of 4 to 8 to a depth of 22 inches. The tube was heated in an electrical furnace to 265° to 270° C., and a gas steam containing 21.25 mmoles per minute of ethylene, 30 mmoles per minute of chlorine (an excess of chlorine) 16 mmoles per minute of nitrogen and 2 mmoles per minute of air was fed into the reactor and the exit gas stream passed through a series of traps cooled to −78° C. After 30 minutes the products were collected and analyzed with the following results:

Product: Mmoles per minute
1,2-dichloroethane _____ 21.25

The excess chlorine was recovered, and the chlorine and carbon balances were about 100%. This indicated an essentially complete conversion of ethylene to dichloroethane.

EXAMPLE 6

The same reactor and reaction conditions were employed in this example as were employed in Example 5 except that the bed was replaced with Sylvite (98.5% KCl) having a mesh size of 4 to 8. After 30 minutes the product stream was collected and analyzed with the following results:

| Product: | Mmoles per minute |
|---|---|
| 1,2-dichloroethane | 21.25 |

The excess chlorine was recovered and chlorine and carbon balances calculated to 100%. This indicated essentially complete conversion of the ethylene to dichloroethane.

The above examples demonstrate the unique ability of our reaction process carried out in the presence of the indicated catalytic and reaction-controlling amount of air, to produce essentially pure dichloroethane in an extremely fast time and with an extremely high efficiency. It is most surprising that this critical control is effected simply by addition of the small amount of air or oxygen, the same reaction being carried out in the absence of the air or oxygen providing mixtures of dichloroethane with other products.

Pursuant to the requirements of the patent statutes, the principle of this invenion has been explained and exemplified in a manner so that it can be readily practiced by those skilled in the art, such examplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A method of producing dichloroethane essentially pure and in high yields and in a short time reaction, comprising contacting chlorine and ethylene vapors in a molar ratio of at least 1 mole of chlorine per mole of ethylene and in the presence of a catalytic and reaction-controlling amount of 0.01 to 2% by weight of oxygen based on the total weight of chlorine, ethylene and oxygen vapors, at a temperature of 80° to 350° C. for at least 0.1 in a bed of 2 to 100 mesh particles of sodium chloride, potassium chloride or mixtures of said sodium chloride and potassium chloride and recovering said dichloroethane.

2. The method of claim 1 in which the oxygen is introduced in air, the amount of air being 0.05 to 10% of the total weight of chlorine, ethylene and oxygen.

3. The method of claim 2 in which the bed is sodium chloride.

4. The method of claim 2 in which the bed is potassium chloride.

5. The method of claim 1 in which the bed is a mixture of sodium chloride and potassium chloride.

6. The method of claim 2 in which the chloride to ethylene molar ratio is abolt 1:1, the temperature is 200° C. to 220° C. and the particle size of the components of the bed is 4 to 16 mesh.

7. The method of claim 2 in which the bed is a fixed bed.

References Cited

UNITED STATES PATENTS

| 2,099,231 | 11/1937 | Ruys et al. | 260—662 |
| 2,520,712 | 8/1950 | Cheney | 260—662 |
| 2,966,525 | 12/1960 | Steen. | |
| 3,079,445 | 2/1963 | Arganbright. | |
| 3,149,171 | 9/1964 | Arganbright. | |
| 3,215,508 | 11/1965 | Piester. | |
| 2,284,482 | 5/1942 | Vaughan et al. | |

LEON ZITVER, Primary Examiner

JOSEPH BOSKA, Assistant Examiner

UNITED STATES PATENT OFFICE
CERTIFICATE OF CORRECTION

Patent No. 3,496,244          Dated February 17, 1970

Inventor(s) Sidney Berkowitz and Albert R. Morgan, Jr.

It is certified that error appears in the above-identified patent and that said Letters Patent are hereby corrected as shown below:

Column 4, line 58, "Sylvinitet" should read --Sylvinite--.

Column 4, line 58, ")" should be deleted.

Column 6, line 6, "0.1" should read --0.1 second--.

Column 6, line 19, "chloride" should read --chlorine--.

Column 6, line 20, "abolt" should read --about--.

Signed and sealed this 18th day of May 1971.

(SEAL)
Attest:

EDWARD M. FLETCHER, JR.
Attesting Officer

WILLIAM E. SCHUYLER, JR.
Commissioner of Patents